United States Patent
Siverklev (10) Patent No.: US 7,604,689 B2
(45) Date of Patent: Oct. 20, 2009

(54) DEVICE FOR MOISTURE EXCHANGE BETWEEN GAS FLOWS

(75) Inventor: Johan Siverklev, Thorbrunsgatan (SE)

(73) Assignee: Air to Air Sweden AB, Lund (SE)

( * ) Notice: Subject to any disclaimer, the term of this patent is extended or adjusted under 35 U.S.C. 154(b) by 499 days.

(21) Appl. No.: 10/574,296

(22) PCT Filed: Oct. 1, 2004

(86) PCT No.: PCT/SE2004/001408

§ 371 (c)(1),
(2), (4) Date: Nov. 29, 2006

(87) PCT Pub. No.: WO2005/033590

PCT Pub. Date: Apr. 14, 2005

(65) Prior Publication Data

US 2007/0084591 A1    Apr. 19, 2007

(30) Foreign Application Priority Data

Oct. 3, 2003    (SE) .................................... 0302637

(51) Int. Cl.
*B01D 53/22* (2006.01)
*F24F 3/14* (2006.01)
*F28F 9/013* (2006.01)

(52) U.S. Cl. ............................ 96/4; 96/8; 96/10; 95/45; 95/52; 261/105; 165/165

(58) Field of Classification Search ................. 96/4, 96/6, 8, 10, 12, 13, 14; 95/45, 46, 52; 261/100, 261/102, 105; 165/165

See application file for complete search history.

(56) References Cited

U.S. PATENT DOCUMENTS 2,610,832 A    9/1952    Holmes et al.

(Continued)

FOREIGN PATENT DOCUMENTS

| EP | 0 661 511 A1 | 12/1994 |
| EP | 0661511 | 12/1994 |
| WO | WO 99/61858 | 12/1999 |

OTHER PUBLICATIONS

International Bureau, "Notification Concerning Transmittal of International Preliminary Report on Patentability (Chapter I of the Patent Cooperation Treaty)" Apr. 13, 2006.

*Primary Examiner*—Jason M Greene
(74) *Attorney, Agent, or Firm*—Holland & Hart LLP (57) ABSTRACT

Device for exchange of moisture, between at least two counter-current gas flows (A, B), comprising a generally closed chamber (1, 101) having an inlet (7, 107) and an outlet (8, 108) for a first gas flow (B), such that the first gas flow flows in a first direction from the inlet to the outlet inside the chamber; and at least one duct (2, 102), which extends inside the chamber, generally in parallel with the first direction, which duct (2, 102) is arranged to conduct a second fluid flow (A) in an opposite direction to the first direction and which duct (2, 102) comprises a duct wall material with high permeability to water. In order to enhance the efficiency of the moisture exchange the device comprises an inlet space for the gas flow B, which inlet space is arranged in the central chamber (1, 101), between the inlet (7, 107) and a first support and flow distributing member (9a, 109a) arranged inside the chamber (1, 101) between the inlet opening (7, 107) and the outlet opening (8, 108), and means for uniform distribution of the gas inside the inlet space for providing a generally parallel and uniform first fluid flow (B) inside the chamber.

18 Claims, 10 Drawing Sheets

U.S. PATENT DOCUMENTS

| | | |
|---|---|---|
| 2,991,048 A | 7/1961 | Rabin |
| 4,066,553 A | 1/1978 | Bardonnet et al. |
| 4,220,535 A * | 9/1980 | Leonard .......................... 96/8 |
| 5,015,269 A * | 5/1991 | Garrett et al. .................... 96/8 |
| 5,181,560 A | 1/1993 | Burn |
| 5,240,612 A * | 8/1993 | Grangeon et al. ................. 96/6 |
| 5,250,091 A | 10/1993 | Nigsch et al. |
| 5,264,171 A * | 11/1993 | Prasad et al. ................. 264/103 |
| 5,525,144 A * | 6/1996 | Gollan ............................. 96/8 |
| 5,779,897 A * | 7/1998 | Kalthod et al. ................... 96/8 |
| 2005/0284293 A1* | 12/2005 | Rubas .............................. 96/8 |

* cited by examiner

DEVICE FOR MOISTURE EXCHANGE BETWEEN GAS FLOWS

FIELD OF THE INVENTION

The present invention relates to a device for exchange of moisture, between at least two counter-current gas flows, comprising a generally closed chamber having an inlet and an outlet for a first gas flow, such that the first fluid flow flows in a first direction from the inlet to the outlet inside the chamber; and at least one duct, which extends inside the chamber, generally in parallel with the first direction, which duct is arranged to conduct a second gas flow in an opposite direction to the first direction and which duct comprise a duct wall material with high permeability to water.

The device is particularly useful for exchanging moisture from a first air flow to a second air flow, in order to desiccate the first air flow. The device may find various different applications e.g. in the fields of stationary and mobile air conditioning, refrigeration and heat exchanging.

PRIOR ART

Such devices are used e.g. for desiccating inlet air to a building, which inlet air is to be fed to a refrigeration unit for cooling the inlet air. U.S. Pat. No. 6,178,966 discloses a device, inter alia for exchanging moisture between an inlet air flow and an exhaust air flow in a building. This prior art device comprises, according to one embodiment, a generally rectangular chamber in which a number of ducts are arranged in parallel to the longitudinal axis of the chamber. The duct walls are made of a water vapour permeable material. A first air flow is fed through the ducts and a second air flow is fed through the chamber outside of the ducts, so that the two air flows flow in a counter current fashion inside the chamber. During this counter current flow, moisture from one air flow penetrates through the water vapor permeable material into the other air flow, while keeping the air in the two flows separated from each other. This allows for desiccating one of the air flows while moistening the other.

Even though this known device allows for exchange of moisture between the two air flows, it exhibits some problems concerning the exchange efficiency since the moisture exchange rate is limited. This limitation in moisture exchange rate is to a large extent caused by unfavourable flow characteristics of the two air flows.

The efficiency of the moisture exchange is of great importance to the over all economy at a lot of different applications, especially when the device for moisture exchange is combined with other devices for treatment of air, such as refrigeration apparatuses including air conditioning units and other heat exchanging units.

BRIEF DESCRIPTION OF THE INVENTION

The present invention is based on the understanding that the exchange rate and thereby the efficiency of the device depends on the flow characteristics of the flows between which the exchange of moisture is to be effected. One object of the present invention is to provide a device for exchange of moisture between at least two counter-current gas flows, which enhances the rate of moisture exchange by creating more favourable flow characteristics of the first gas flow inside the chamber.

Another object of the invention is to provide such a device with which the first flow inside the chamber, outside of the ducts is formed generally parallel and homogeneous over the cross section of the chamber.

These objects are achieved by a device according to the first paragraph of this description, which device exhibits the special technical features as set out in the characterizing portion of claim 1.

The inlet space, which is delimited by the first support and flow distributing member forms an inlet plenum for the first gas flow. The means for uniform distribution of gas inside the inlet space prevents gas flow from passing only the shortest distance between the inlet and outlet of the chamber. Instead the air in the inlet space is uniformly distributed over the flow openings in the support and flow distributing members whereby a generally uniform and parallel first fluid flow is created in the chamber, outside of the ducts. This in turn contributes to enhancing the exchange rate by distributing the first fluid flow evenly over the entire length of all ducts inside the chamber.

The means for uniform distribution of the gas inside the inlet space may comprise the first support and flow distributing member, whereby the accumulated size per are of the flow openings varies over the area of the support and flow distributing member such that the flow resistance through the support and flow distributing member decreases with the distance from the inlet opening. This may be achieved by varying the sizes of the flow openings or the number of openings per area. The means for uniform distribution of gas inside the inlet space may also comprise a tapered form of end portions of the ducts, which end portions extend through the inlet space.

Other objects and advantages of the invention appear from the dependent claims.

DESCRIPTION OF EMBODIMENTS OF THE INVENTION

Exemplifying embodiments of the invention will be described below, with reference to the accompanying drawings, FIG. 1-5, wherein.

In the described embodiments the fluids between which the moisture exchange is effected are air, but it is contemplated that the device according to the invention also may be used for moisture exchange between other gases. The embodiments of FIGS. 1 and 2 differ only in that a first inlet opening 5 and a first outlet opening 6 for an air flow A are arranged in different walls of the device. In the following reference is made to FIGS. 1 and 2 irrespective of this difference.

Figure 1:
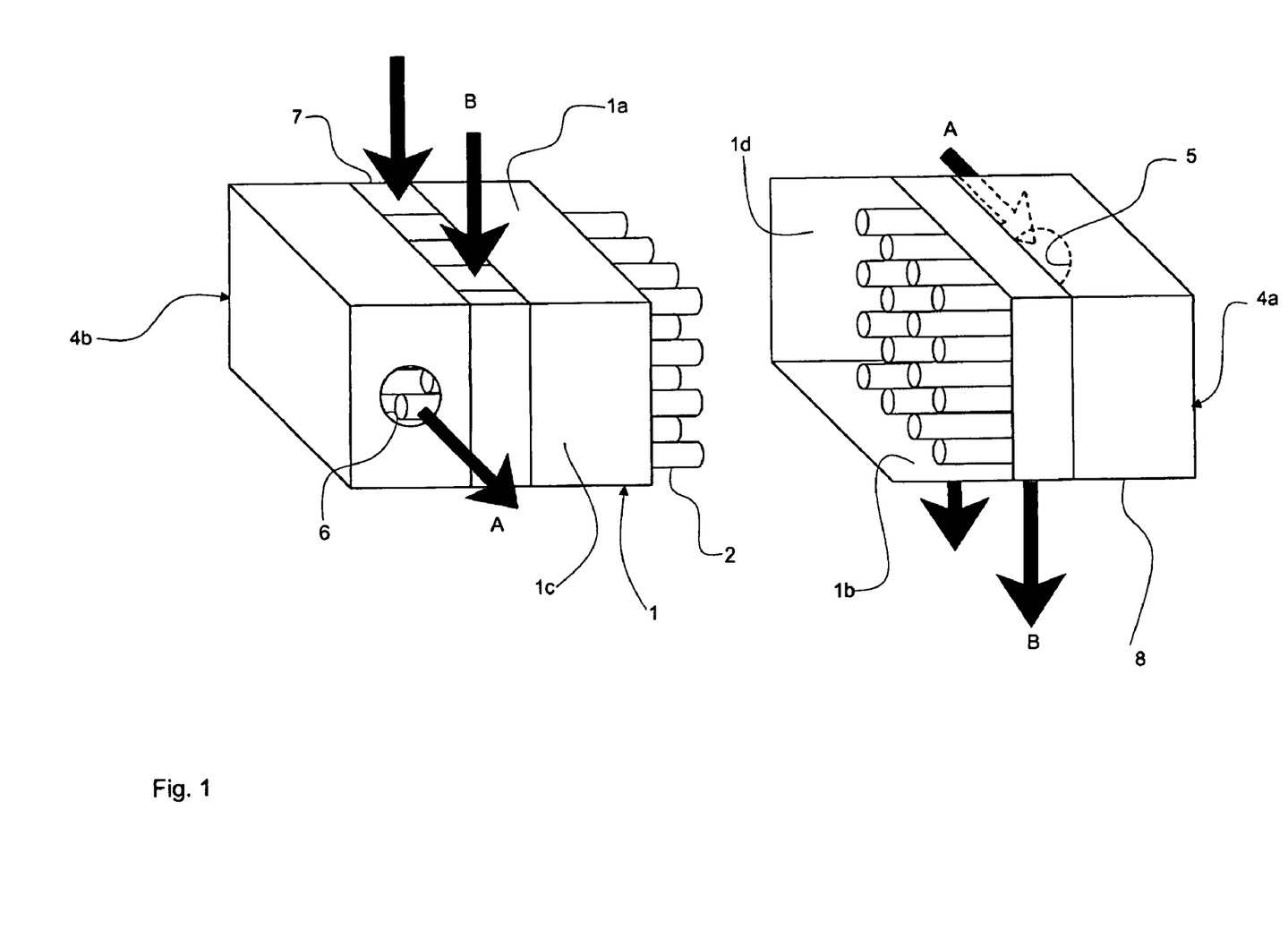
FIG. 1 is a schematic drawing in perspective with parts broken away of a first embodiment of the device according to the invention.
Figure 2:
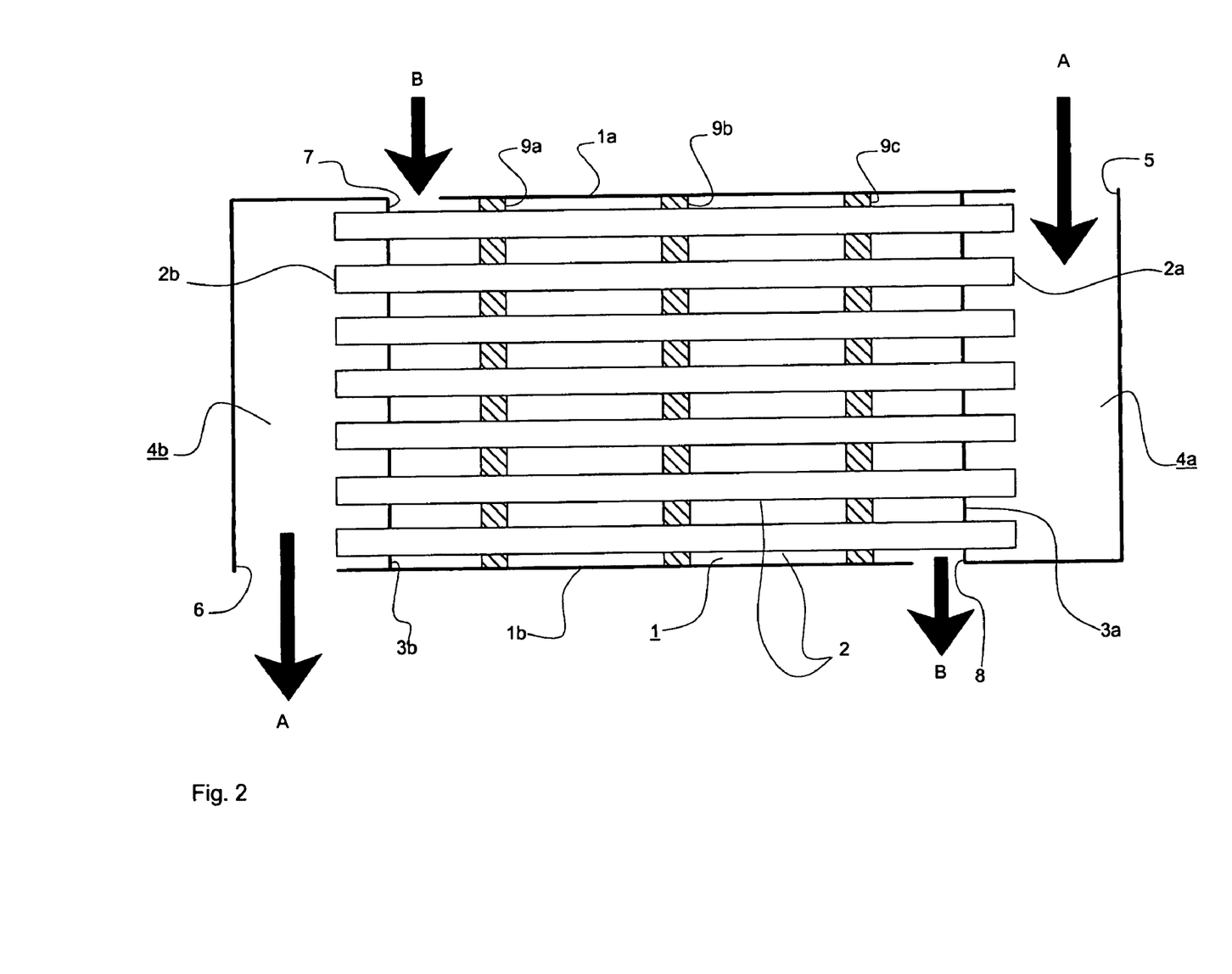
FIG. 2 is a schematic side elevation cut through a vertical longitudinal plane of a device according to a second embodiment.

The moisture-exchanging device shown in FIGS. 1 and 2 includes a centrally positioned chamber 1, as well as a first 4a and a second 4b adjacent side chamber, positioned at respective ends of the central chamber 1. The central chamber 1 is defined by four side walls 1a, 1b, 1c, 1d and two end walls 3a, 3b which later also constitute corresponding end walls of respective side chamber 4a, 4b. A plurality of fluid ducts 2 extend inside the central chamber 1, in parallel with the sidewalls 1a-1d and through the end walls 3a, 3b. The fluid ducts 2 are made of a membrane material having a high permeability to moisture but a low permeability to flowing air. One portion of the sidewalls 1a-1d adjacent to the respective end walls 3a, 3b may be made of a flexible material for allowing the side chambers 4a, 4b to move a certain distance to and away from the central chamber 1.

First open ends 2a of the fluid ducts 2 are arranged in the first side chamber 4a, which constitutes an inlet plenum for an air flow A. Second open ends 2b of the fluid ducts 2 are arranged in the second side chamber 4b, which constitutes an outlet plenum for the air flow A. A first inlet opening 5 for airflow A is arranged in one of the side walls of the first side chamber 4a and a first outlet opening 6 is arranged in one of the side walls of the second side chamber 4b. A closed flow path for the first air flow A is thus provided from the first inlet opening 5 through the first side chamber 4a, the fluid ducts 2 and the second side chamber 4b to the first outlet opening 6.

The central chamber 1 exhibits a second inlet opening 7 and a second outlet opening 8 for another airflow B. The second inlet opening 7 is arranged in a sidewall 1a of the central chamber 1, in proximity to end wall 3b. The second outlet opening 8 is arranged in proximity to end wall 3a and in another central chamber sidewall 1b, which is opposite to sidewall 1a. A closed flow path for the air flow B, which is counter-current to air flow A, is thus provided from the second inlet opening 7, through the central chamber 1 to the second outlet opening 8.

If e.g. moist exhaust air B is supplied to the central chamber 1 through the second inlet opening 7 and dry intake air is supplied to the ducts 2 through the first inlet opening 5 and the first side chamber 4a, the two air flows A and B will flow in a counter-current fashion through the central chamber 1 without being in direct contact with each other. During this counter-current flow, moisture from flow B will be transmitted from flow B to flow A through diffusion through the membrane walls of the ducts 2.

Figure 4:
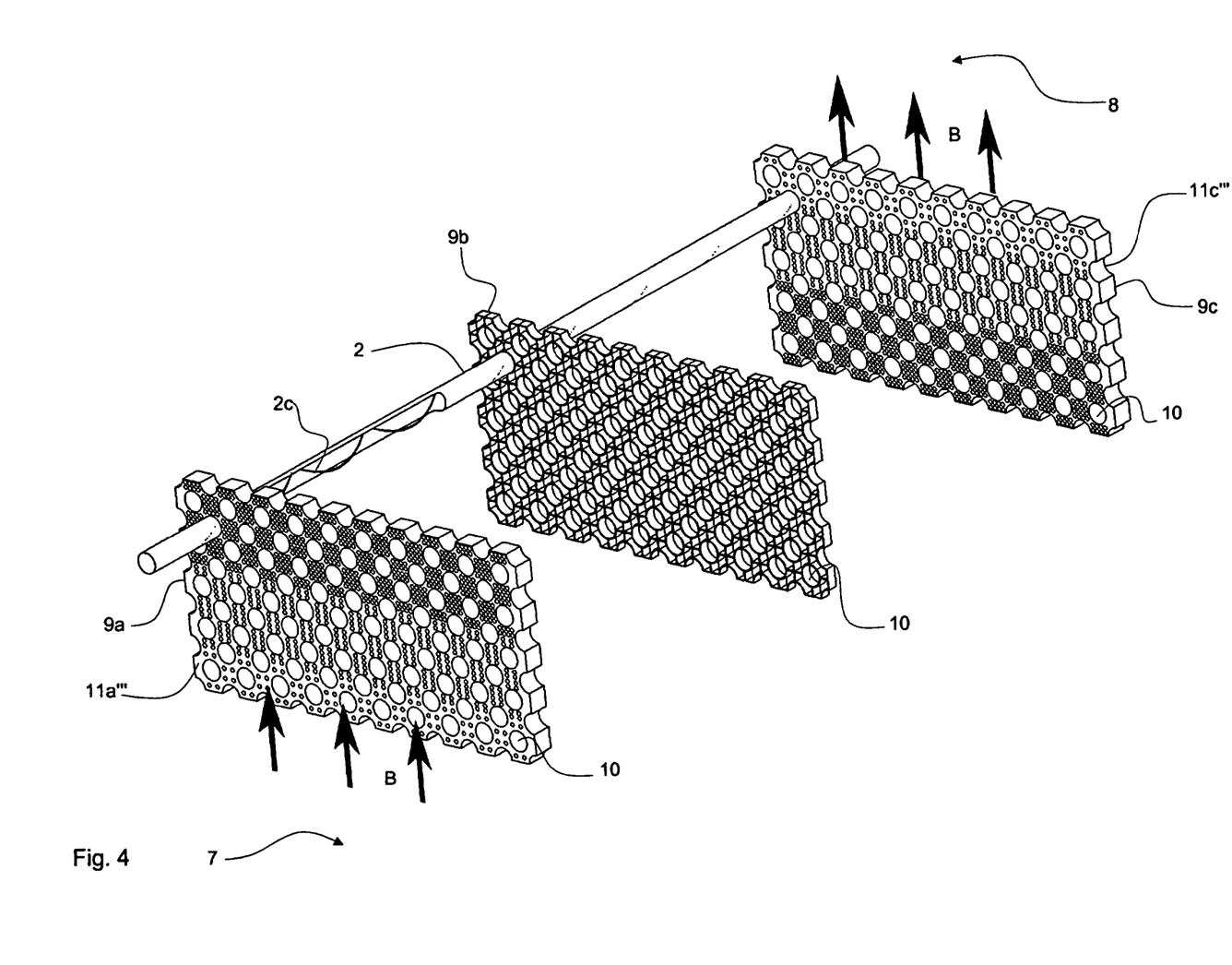
FIG. 4 is a drawing according to FIG. 3 of a fourth embodiment of the invention
Figure 5:
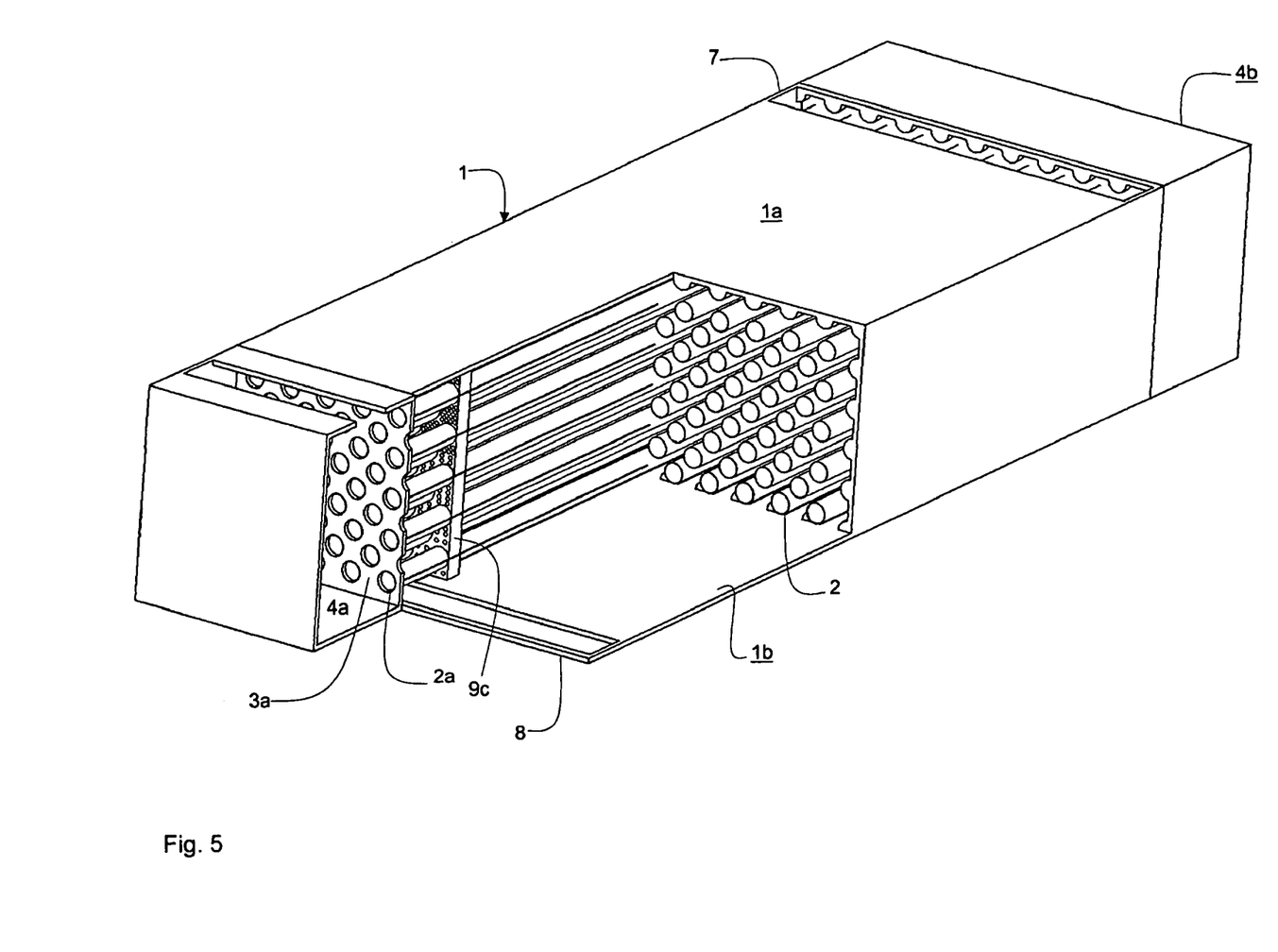
FIG. 5 is a computer generated model drawing of a device according to the invention.
Figure 6:
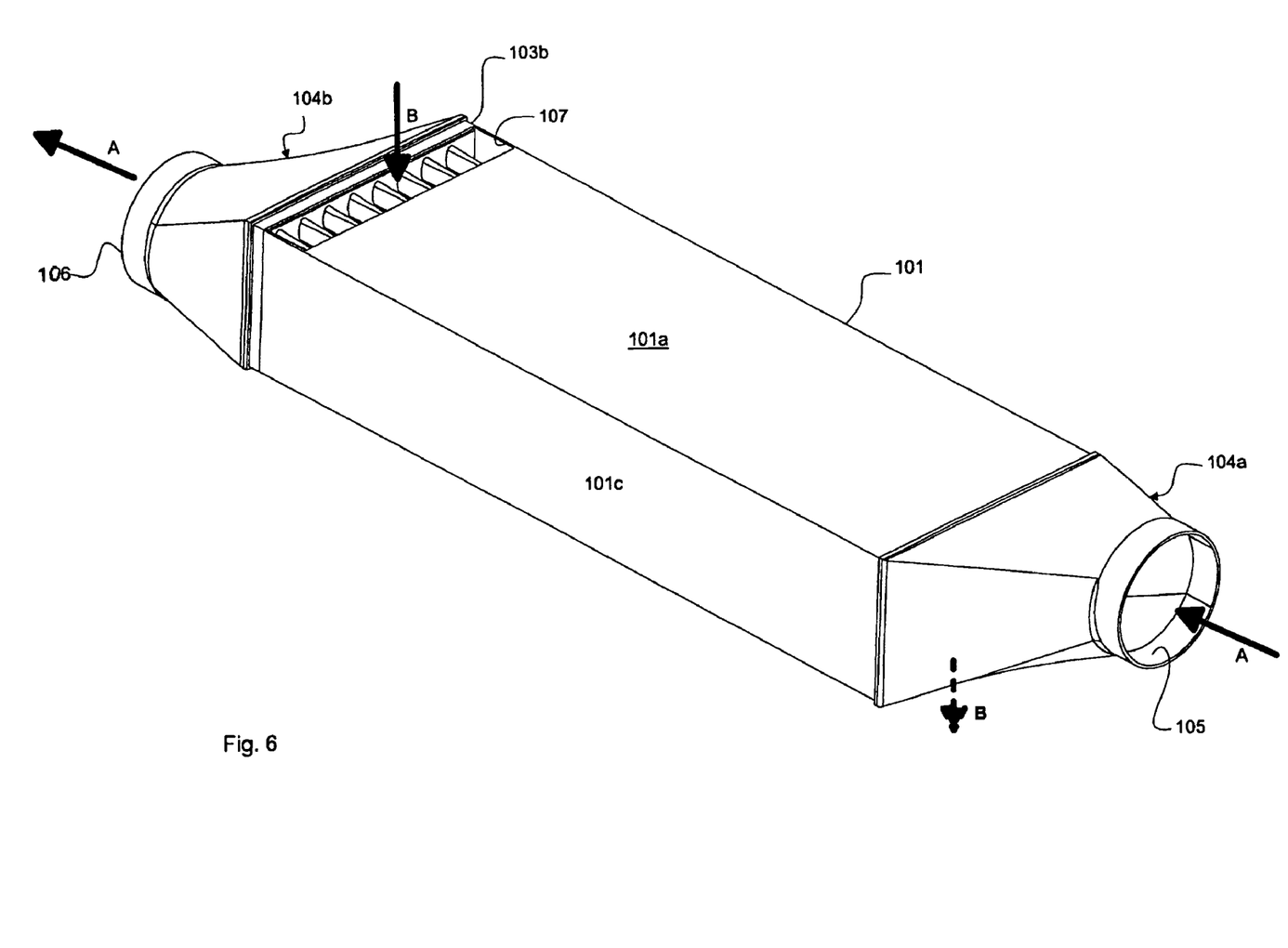
FIG. 6 is a schematic drawing in perspective of a further embodiment of the device according to the invention.
Figure 7:
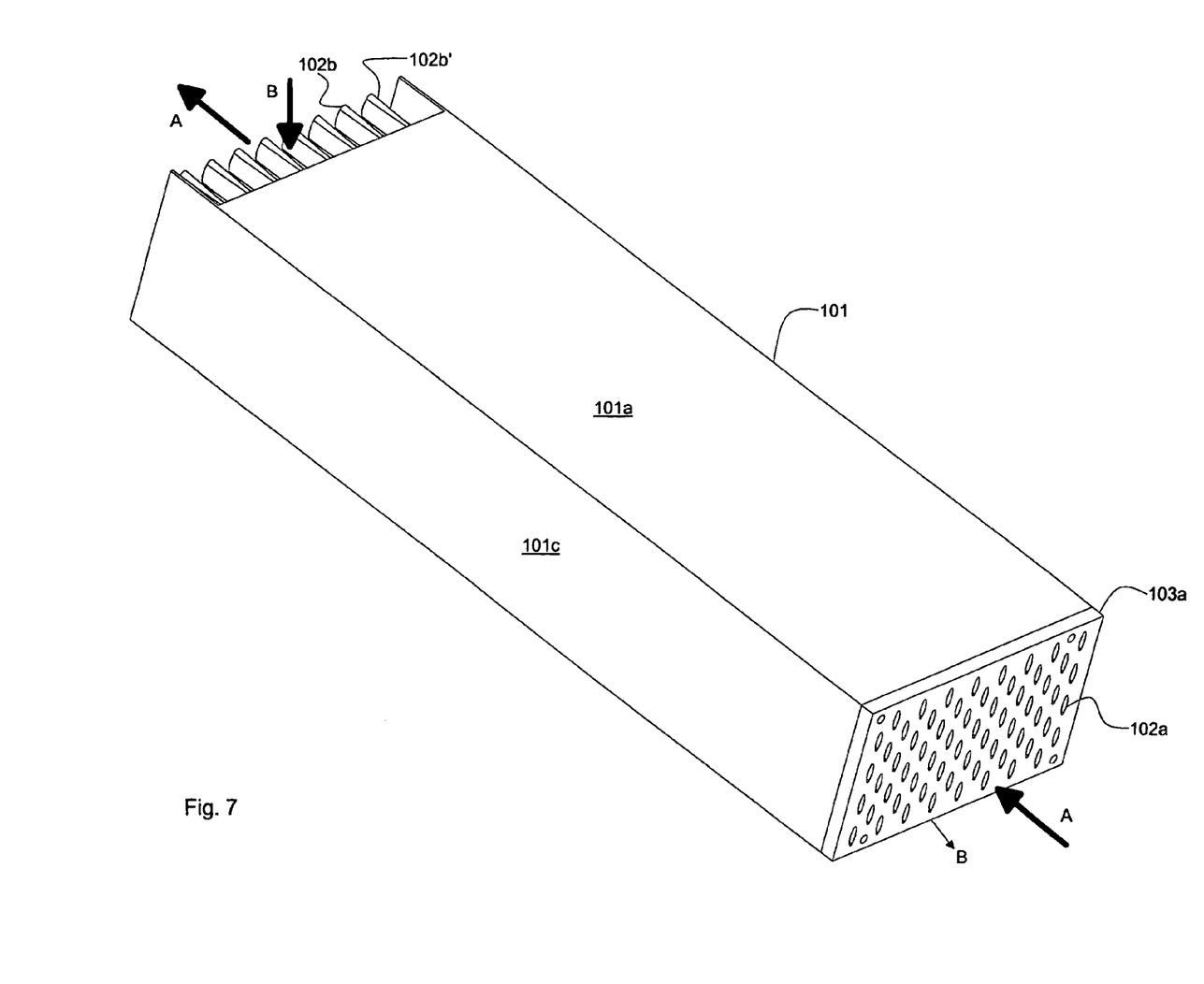
FIG. 7 is a schematic drawing in perspective of a central portion of the device shown in FIG. 6.
Figure 8A:
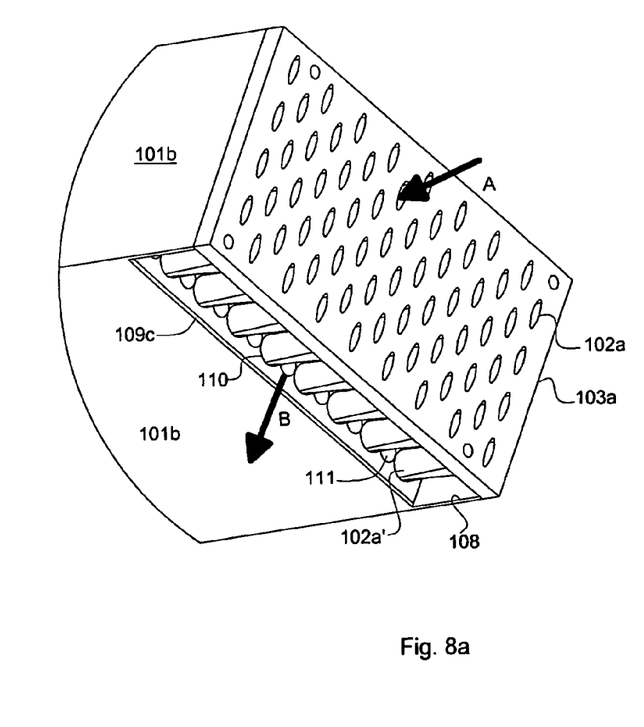
FIGS. 8a and 8b are schematic drawings in perspective of the respective end portions of the central portion shown in FIG. 7.
Figure 8B:
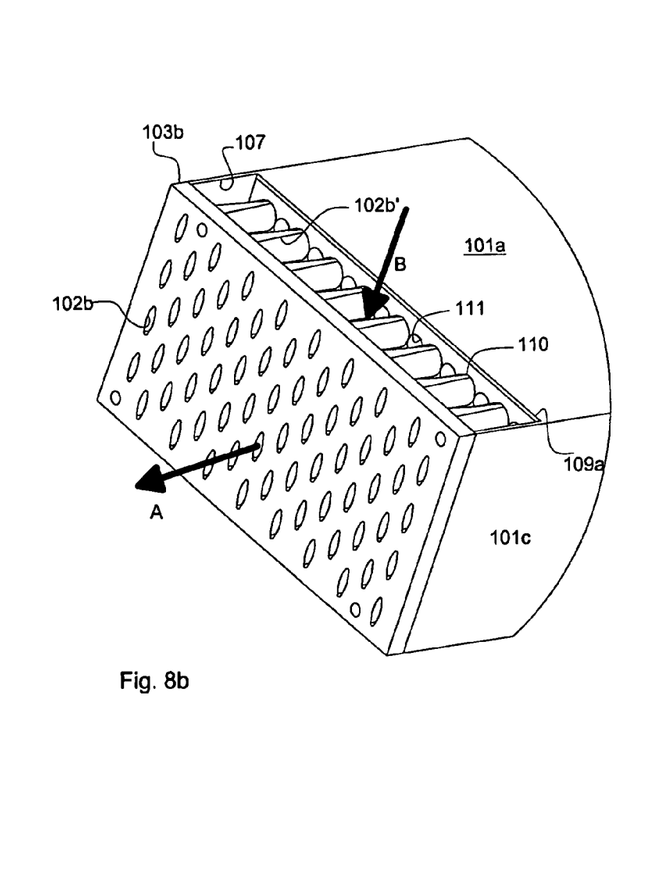
Figure 9:
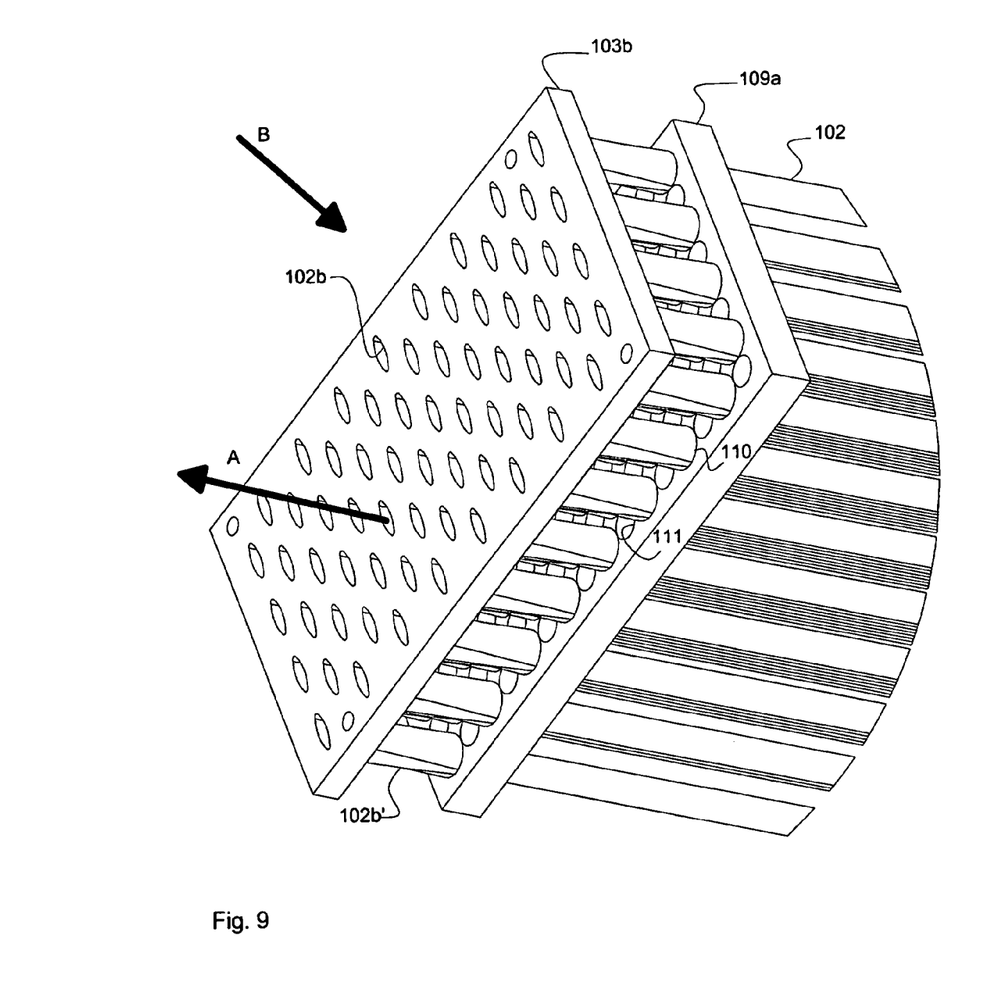
FIG. 9 shows the end portion of FIG. 8b with side walls removed.

According to the embodiment shown in FIG. 4, a thin wire spiral 2c is arranged at the inner wall of each duct 2 in order to optimise the ability of flow A to absorb moisture. The wire spirals contribute to induce a turbulent flow inside the ducts 2. This turbulent flow prevents the formation of a boundary layer of stationary air adjacent to the inner walls of the ducts 2. Such a stationary boundary layer would otherwise deteriorate the absorption of moisture into flow A. Each wire spiral is formed as a preferably plastic, helical compression spring. The wire spirals thereby also contribute to keep the flexible membrane ducts 2 longitudinally stretched, so that sagging of the ducts is prevented. Keeping the ducts stretched also contributes to achieve a uniform and parallel airflow B inside the central chamber 1, outside and around the ducts 2.

Alternatively, moist air A is supplied to the ducts 2 and dry air B is supplied to the central chamber. Also in such a case the wire spirals contribute to enhance the moisture exchange from flow A to flow B. The wire spirals induce a turbulent flow inside the ducts B, whereby the formation of a desiccated boundary layer adjacent to the inner wall surfaces of the ducts 2 is prevented.

The wire spiral could also be omitted. In such a case turbulence could be induced to the flow inside and/or outside of the ducts, adjacent to the duct walls, by forming the duct wall material so that the inside and/or outside surface respectively of the ducts exhibits turbulence inducing irregularities. E.g. the duct wall material could be microscopically ribbed or embossed or in other ways uneven.

Figure 3:
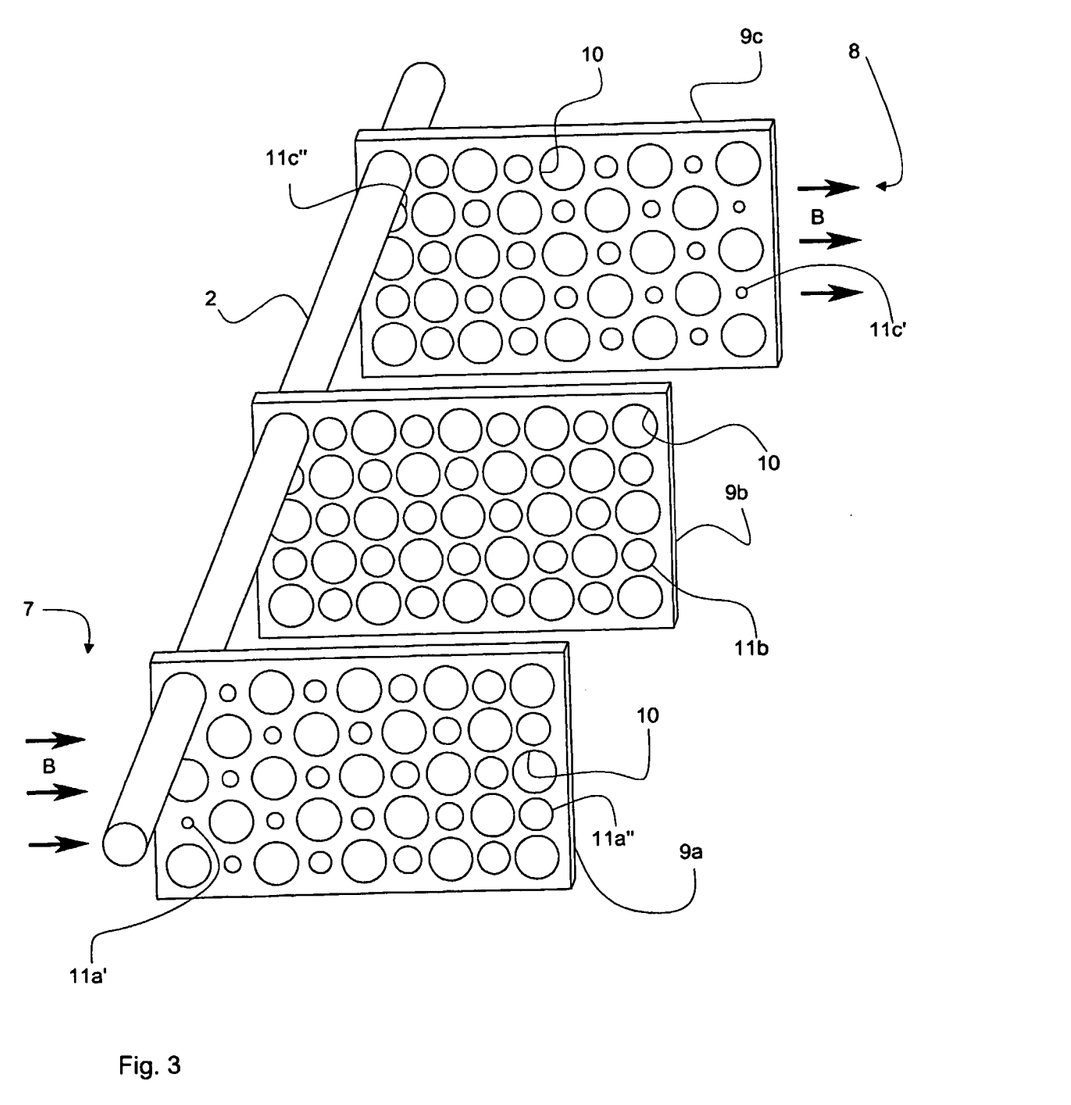
FIG. 3 is a schematic drawing in perspective of the interior of a device according to a third embodiment of the invention.

FIG. 3 illustrates means for creating a uniform and parallel air flow B inside the chamber according to one embodiment of the invention. Since the inlet opening 7 and outlet opening 8 of the central chamber are arranged in opposite side walls 1a, 1b, (FIGS. 1 and 2) a problem to achieve a uniform and parallel air flow B inside the central chamber over its entire cross sectional area arises. Such a uniform and parallel airflow is of great importance for achieving effective and uniform moisture exchange over the entire active length of all ducts 2.

In order to solve this problem a number of support and flow distributing members 9a, 9b, 9c (see FIG. 3) are arranged inside the central chamber 1, between the inlet opening 7 and the outlet opening 8. The members 9a-9c are arranged essentially parallel to the cross section of the central chamber and cover essentially the entire cross sectional area. Each member 9a-9c includes a set of duct openings 10 through which the ducts extend. The duct openings 10 support the ducts 2 and are distributed over the area of respective member 9a-9c in a manner illustrated in FIG. 3, so that the ducts 2 are uniformly distributed over the cross sectional area of the central chamber 1. This distribution of the duct openings 10 is preferred but if so desired, the duct openings and ducts may also be arranged in straight rows and columns, such as indicated in FIG. 1.

Each support and flow distributing member 9a-9c also presents a set of flow distributing openings 11a, 11b, 11c, which extend through the entire depth of the members 9a-9c, in the longitudinal direction of the ducts 2. All of the flow distributing openings 11b in the set of openings arranged in the centrally positioned member 9b have the same diameter. Whereas the diameter of the flow distributing openings 11a in the set of openings arranged in the member 9a, positioned closer to the inlet opening 7, vary over the cross section of the central chamber 1. The variation of diameter is configured in such a way that the flow distributing openings 11a' positioned adjacent to the sidewall 1a (FIGS. 1 and 2) containing the inlet opening 7 for air flow B have a smallest diameter. The diameters of the flow distributing openings increase gradually over the cross section of the central chamber 1, towards the side wall 1b being opposite to side wall 1a, so that the flow distributing openings 11a", being adjacent to the side wall 1b, have a largest diameter. The support and flow distributing member 9c, being closer to the outlet opening 8, has a configuration of the variation of the flow distributing opening diameters which is corresponding but reversed to that of member 9a. I.e., in member 9c, the flow distributing openings 11c', positioned adjacent to the sidewall 1b containing the outlet opening 8, have a smallest diameter, whereas the flow distributing openings 11c" at the opposite side wall 1a have a largest diameter.

The different diameters of the flow distributing openings 11a-11c create different pressure drop as the airflow B passes through the support and flow-distributing members 9a-9c. Air, which is supplied through the inlet opening 7, is hereby forced to be uniformly distributed in the inlet space, which is formed up-streams of the support and flow distributing member 9a, between this member 9a and the end wall 3b. At the opposite end, which is adjacent to the outlet opening 8 of the central chamber 1 the same applies in a reversed manner. By this means, it is prevented that incoming air flow diagonally through the central chamber 1, from the inlet opening 7 to the outlet opening 8, such as would be the case without the arrangement of the especially designed and configured support and flow distributing members 9a-9c. Hereby, a uniform and parallel airflow B is created over the entire length and cross section of the central camber 1. This in turn contributes in great extent to an enhanced and more effective moisture exchange between the two airflows A and B.

In an alternative embodiment shown in FIG. 4, all of the flow distributing openings 11a''', 11b''' of the two endmost support and flow distributing members 9a, 9c are arranged with essentially the same diameter. For creating a varied pressure resistance over the cross sectional area of the respective support and flow distributing member, the number of openings per area varies over the cross section over the member. At the upstream member 9a, the number of openings 11a''' per area increases with the distance from the sidewall 1a containing the inlet opening 7. At the downstream member 9c, the number of openings 11c''' per area decreases with the distance from the same sidewall 1a.

According to a not shown embodiment the flow distributing openings in one or several of the support and flow distributing members are arranged with essentially the same diameter and with essentially the same number of openings per area over the entire support and flow distributing member. In such case, the uniformity and parallelism of the flow B, inside the central chamber may be enhanced by arranging the total volume of that portion of the central chamber which is positioned upstream of at least the most upstream support and flow distributing member great in relation to the area of each opening. I.e. the volume of the central chamber between the upstream support and flow distributing member and the adjacent end wall should be large in relation to the area of each flow distributing opening in that support and flow distributing member.

In the embodiment shown in FIG. 4, the centrally arranged support and flow distributing member 9b is further formed as a grid, providing support to the ducts while presenting as little influence on the air flow as possible. The grid may be designed with different grid patterns between the support openings, in order to reduce the flow resistance while at the same time preventing the formation of laminar flow. The grid may e.g. be arranged with cross or diamond shaped supports between the duct support openings.

According to still another embodiment (not shown) and in order to further enhance the parallelism of the air flow B over the length of the central chamber, the support and flow distributing member positioned up- and down-stream in the central chamber adjacent to the inlet and outlet opening respectively, may be formed with a certain depth in the longitudinal direction of the ducts. By this means, the flow distributing openings are formed as cylinders with a certain length, which corresponds to the depth of the support and distributing member. Such a cylindrical configuration of the flow distributing openings reduces any flow velocities in directions not parallel to the axial direction of the cylindrical openings, i.e. not parallel to the longitudinal direction of the ducts. Hereby, a flow B with an increased parallelism is created down-stream the support and flow distributing member, which further enhances the effectiveness of moist exchange between the two air flows A and B.

FIGS. 6-10 show a further embodiment. The moisture-exchanging device shown in FIGS. 6-10 includes a centrally positioned chamber 101, as well as a first 104a and a second 104b adjacent side chamber, positioned at respective ends of the central chamber 101. The central chamber 101 is defined by four side walls, only side walls 101a-c being shown in the figures, and two end walls 103a, 103b, which later also constitute corresponding end walls of respective side chamber 104a, 104b. The end wall 103b is visible in FIGS. 6 and 8-10, but removed in FIG. 7. A plurality of fluid ducts 102 extend inside the central chamber 101, in parallel with the sidewalls and through the end walls 103a, 103b.

First open ends 102a of the fluid ducts 102 are arranged in the first side chamber 104a, which constitutes an inlet plenum for an air flow A. Second open ends 102b of the fluid ducts 102 are arranged in the second side chamber 104b, which constitutes an outlet plenum for the air flow A. The walls of the side chambers 104a, 104b are arranged axially tapering away from the central chamber 101. A circular inlet opening 105 for airflow A is arranged in the narrower portion of first side chamber 104a and a circular outlet opening 106 is arranged in the narrower portion of the second side chamber 104b. A closed flow path for the first air flow A is thus provided from the inlet opening 105 through the first side chamber 104a, the fluid ducts 102 and the second side chamber 104b to the outlet opening 106.

The central chamber 101 exhibits a second inlet opening 107 and a second outlet opening 108 for another airflow B. The second inlet opening 107 is arranged in the sidewall 101a of the central chamber 101, in proximity to the end wall 103b. The second outlet opening 108 is arranged in proximity to the end wall 103a and in another central chamber sidewall 101c, which is opposite to sidewall 101a. A closed flow path for the air flow B, which is counter-current to air flow A, is thus provided from the second inlet opening 107, through the central chamber 101 to the second outlet opening 108.

Thus, except for the shape of the side chambers 104a, 104b, the embodiment shown in FIGS. 6-10 very closely corresponds to the embodiment described with reference to FIGS. 1 and 2. However, the support and flow distributing members 109a, 109c of the embodiment shown in FIGS. 6-10 differ from the ones described above. In this embodiment the uniform and parallel air flow B inside the central chamber 101 is not created by arranging the flow distributing openings with varying area or number per area, such that the accumulated size of the openings vary over the area of the support and flow distributing members. Instead the uniform and parallel air flow B is created by optimising the shape of the portions of the ducts 102 which portions extend through the inlet and outlet spaces between the respective support and flow distributing member 109a, 109c and end wall 103a, 103b. As is best seen in FIGS. 8a-b, 9 and 10, the support openings 110 are arranged in staggered rows and columns and the flow distributing openings 111 are evenly distributed in a corresponding pattern between the support openings 110. All of the flow openings 111 of both support and flow distributing members 109a, 109c have the same size, which size is the maximum size which fits between the support openings 110. In this way the pressure drop of airflow B over the support and flow distributing members 109a, 109c is minimized.

In correspondence with the embodiment shown in FIGS. 1 and 2 it is of great importance that the air of air flow B is uniformly distributed in the inlet and outlet spaces between the respective end wall 103a, 103b and support and flow distributing member 109c and 109a, for creating a parallel and uniform air flow B inside the central chamber 101, between the support and flow distributing members 109a, 109c. For achieving this the end portions 102a', 102b' of the ducts 102, which end portions are arranged in the inlet and outlet space are arranged tapering in the axial direction away from the respective support and flow distributing member 109a, 109c. The tapering of the duct end portions 102a', 102b' is so arranged that the cross section of the ducts 102 is circular adjacent to the support and flow distributing members 109c, 109a and transforms continuously to the respective end wall 103b, 103a, where the cross section is elliptic. The elongated direction of the elliptic cross section is arranged perpendicular to the side wall 101a, 101c in which the respective inlet 107 and outlet 108 opening for flow B is arranged. Thus, the elongated direction of the elliptic cross section is generally parallel to direction the air flow B when this enters and leaves the inlet and outlet spaces.

The tapering is also so arranged that the cross sectional area of the duct end portions 102a', 102b' is maintained essentially constant over the entire length of each end portion. This cross sectional area of each end portion 102a', 102b' is further essentially the same as the cross sectional area of the rest of the duct 102. By this means no undue pressure drop is created for air flow A inside the end portions of the ducts.

Figure 10:
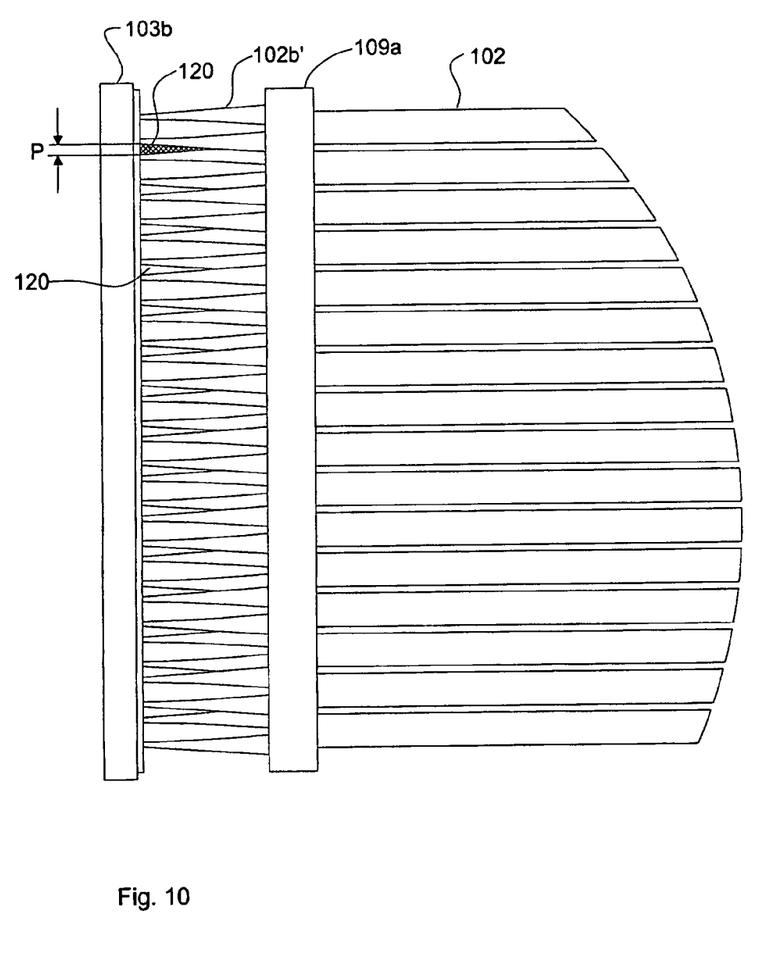
FIG. 10 is a top view of the end portion shown in FIG. 9.

The tapering of the end portions 102a', 102b' forms a free straight passage 120 for air between each column of ducts 102, in the inlet space and in proximity to the end wall 103b, from the inlet opening 107, all the way to the opposite side wall 101c of the central chamber 101. As shown in FIG. 10, the cross sectional width of each passage 120 is defined by the distance between the surfaces facing each other of the end portions 102b' in two adjacent columns of ducts. In the figure, the cross section of one passage 120 has been filled with a squared line pattern for increased visibility and it can be seen that it reaches its maximum width P adjacent to end wall 103b.

By means of these free straight passages 120 in the inlet space, the friction of the air flow B, when passing through the inlet space is drastically reduced. Hereby, the air of air flow B is considerably less obstructed when passing from the inlet 107 to the opposite side wall 101c whereby the air of air flow B is uniformly distributed inside the inlet space. This in turn contributes to a great extend to creating a parallel and uniform air flow B inside the central chamber 101, between the support and flow distributing members 109a, 109c, such that the efficiency of the moisture exchange between the two air flows A and B is greatly enhanced.

Also the end portions 102a' of the ducts 102 arranged in the outlet space are formed with a corresponding tapering cross section, forming a free straight passage in proximity to the end wall 103a, for air when passing inside the outlet space towards the outlet 108. The friction of the air leaving through the outlet space is thus reduced which also to a great extend contributes to create a parallel and uniform air flow B inside the central chamber upstream of the support and flow distributing member 109c.

In the shown embodiment the tapering of the end portions 102a', 102b' of the ducts is achieved by forming these end portions of plastic nozzles having the tapering shape as described above. The nozzles are attached to the respective support and flow distributing member 109a, 109c and communicates here with the rest of the respective duct 102. The inner diameter of the nozzles is, adjacent to the support and flow distributing member, essentially the same as the inner diameter of the rest of the ducts. However, since the nozzles are made of a rigid material and as can be seen from the figures, the outer diameter of the nozzles is larger than the outer diameters of the permeable portions of the ducts. The nozzles are further attached to corresponding openings in the side walls 103a, 103b.

The description of the embodiments above is given as an example only. It is evident that various changes and modifications may be made without deviating from the spirit and scope of the invention as claimed in the appending claims.

Different features of the described embodiments may e.g. be combined. Especially, the described variation of the accumulated size per area of the flow distributing openings over the area of the support and flow distributing members may be combined with the tapering shape of the end portions of the ducts.

The tapering shape of end portions of the ducts may be achieved by deforming an end portion of the moisture permeable material, instead of attaching a nozzle.

The central chamber and the side chambers may e.g. be cylindrically formed, whereby one continuous cylindrical wall constitutes the side wall of the chambers.

The inlet and outlet openings for flow A may also, especially if the chambers are cylindrical, be arranged in the end walls of the side chambers.

The invention claimed is:

1. Device for exchange of moisture, between at least two counter-current gas flows (A, B), comprising a chamber (1, 101) having an inlet (7, 107) and an outlet (8, 108) for a first gas flow (B), such that the first gas flow flows in a first direction from the inlet to the outlet inside the chamber; and at least one duct (2, 102), which extends inside the chamber, at least in a direction substantially parallel with the first direction, which duct (2, 102) is arranged to conduct a second fluid flow (A) in an opposite direction to the first direction and which duct (2, 102) comprises a duct wall material with high permeability to water, characterized by an inlet space for the gas flow B, which inlet space is arranged in the chamber (1, 101), between the inlet (7, 107) and a first support and flow distributing member (9a, 109a) arranged inside the chamber (1, 101) between the inlet opening (7, 107) and the outlet opening (8, 108), and having an extension in a plane which is non-parallel to the first direction, such that it extends essentially over the entire area of said plane inside the chamber, which support and flow distributing member comprises at least one duct opening (10, 110) through which the at least one duct (2, 102) extends and a set (11a, 11c, 111) of flow distributing openings, and by means for uniform distribution of the gas inside the inlet space for providing a substantially parallel and uniform first fluid flow (B) inside the chamber.

2. Device according to claim 1, wherein said set (11a, 11c) of flow distributing openings is arranged such that sizes of the openings (11a', 11a", 11c', 11c") vary over the area of the support and flow distributing member (9a, 9c).

3. Device according to claim 1, wherein said set of flow distributing openings is arranged such that a number of openings (11a''', 11c''') per area varies over the area of the support and flow distributing member (9a, 9c).

4. Device according to claim 1, wherein the chamber (1) is defined by a number of side walls (1a, 1b, 1c, 1d) and two end walls (3a, 3b), said inlet (7) being arranged in a first (1a) of said side walls and said outlet (8) being arranged in a second side wall (1b), which is opposite to the first side wall, and wherein a first (9a) support and flow distributing member is arranged closer to the inlet (7) than a second (9c) support and flow distributing member, and which first support and flow distributing member comprises a first set (11a) of flow openings which is configured so that the accumulated size of the openings (11a', 11a", 11a''') per area of the support and flow distributing member increases with the distance from the first side wall (1a).

5. Device according to claim 4, wherein the second (9c) support and flow distributing member comprises a second set (11c) of openings, which is configured so that the accumulated size of the openings (11c', 11c", 11c''') per area of the support and flow distributing member increases with the distance from the second side wall (1d).

6. Device according to claim 4, wherein a third support and flow distributing member (9b) is arranged between the first (9a) and second (9c) support and flow distributing members, which third support and flow distributing member is configured for providing a minimum flow resistance against the first air flow (B), while still inducing turbulence to prevent the formation of laminar flow between the ducts (2).

7. Device according to claim 1, comprising a plurality of ducts (102), each comprising an end portion (102b'), which extends through the inlet space, between the first support and flow distributing member (109a) and an end wall (103b) of the central chamber (101), which end portion is tapering towards the end wall such that at least one free straight passage (120) for gas is formed between the end portions of the ducts, essentially perpendicular to the longitudinal direction of the end portions.

8. Device according to claim 7, wherein the cross sectional area of the end portions (102b') is essentially constant over the length of the end portion.

9. Device according to claim 8, wherein the cross sectional area of the end portion (102b') is essentially equal to the cross sectional area of the rest of the duct (102).

10. Device according to claim 7, wherein the end portions (102b') are formed of separate nozzles.

11. Device according to claim 1, comprising an outlet space for the gas flow B, which outlet space is arranged in the chamber (1, 101), between the outlet (8, 108) and a second support and flow distributing member (9b, 109b) and by means for uniform distribution of the gas inside the outlet space for providing a generally parallel and uniform first fluid flow (B) inside the chamber.

12. Device according to claim 1, wherein a wire spiral (2c) is arranged at the inside of the duct wall for inducing turbulence to the second fluid flow (A), inside the duct (2).

13. Device according to claim 1, wherein a wire spiral is arranged at the outside of the duct wall for inducing turbulence to the first fluid flow (B) in the chamber (1) in the proximity of the duct wall.

14. Device according to claim 1, wherein the duct wall material presents irregularities in the duct wall surface for inducing turbulence to the fluid flow (A, B) in proximity to the duct wall, on the inside and/or outside of the duct wall.

15. Device according to claim 1, wherein the device is provided in a stationary arrangement for air treatment in a refrigeration apparatus.

16. Device according to claim 1, wherein the device is provided in a mobile arrangement for air treatment in a refrigeration apparatus.

17. Device according to claim 1, wherein the device is provided in a stationary arrangement for air treatment in a heat exchanger.

18. Device according to claim 1, wherein the device is provided in a mobile arrangement for air treatment in a heat exchanger.

* * * * *